United States Patent
Takizawa et al.

(10) Patent No.: US 9,336,911 B2
(45) Date of Patent: May 10, 2016

(54) CORE THERMAL LIMIT VALUE MONITORING DEVICE, CORE MONITORING SYSTEM AND CORE THERMAL LIMIT VALUE MONITORING METHOD

(75) Inventors: Osamu Takizawa, Tokyo (JP); Naoto Odagawa, Tokyo (JP); Atsuhiko Koizumi, Tokyo (JP); Tsuyoshi Masugi, Tokyo (JP); Kiyoteru Suzuki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 240 days.

(21) Appl. No.: 13/549,992

(22) Filed: Jul. 16, 2012

(65) Prior Publication Data

US 2012/0281801 A1    Nov. 8, 2012

Related U.S. Application Data

(63) Continuation-in-part of application No. PCT/JP2011/000463, filed on Jan. 28, 2011.

(30) Foreign Application Priority Data

Jan. 28, 2010   (JP) ................................. 2010-016199

(51) Int. Cl.
*G21C 17/00*   (2006.01)
*G21C 17/10*   (2006.01)
(Continued)

(52) U.S. Cl.
CPC .............. *G21C 17/10* (2013.01); *G21C 17/108* (2013.01); *G21D 3/001* (2013.01); *G21D 3/04* (2013.01); *Y02E 30/40* (2013.01)

(58) Field of Classification Search
CPC ...... G21C 17/00; G21C 17/10; G21C 17/108; G21D 3/10
USPC ........................... 376/247, 245, 254; 702/130
See application file for complete search history.

(56) References Cited

U.S. PATENT DOCUMENTS 4,908,775 A * 3/1990 Palusamy et al. ............... 702/34
5,638,413 A * 6/1997 Uematsu et al. ............... 376/245
(Continued)

FOREIGN PATENT DOCUMENTS

JP   59-079897 A   5/1984
JP   06-222175 A   8/1994
(Continued)

*Primary Examiner* — Jack W Keith
*Assistant Examiner* — Sharon M Davis
(74) *Attorney, Agent, or Firm* — Foley & Lardner LLP

(57) ABSTRACT

According to an embodiment, core thermal limit monitoring device is provided with calculating units, and signal input processing units, synchronization processing units and signal output processing units, corresponding to the calculating units. The calculating unit determines if it is necessary to output a signal to the control unit by calculating the thermal state values of the monitoring regions based on a signal representing the state of the core. The synchronization processing unit, if it is necessary to output a signal to the control unit, transmits a signal-output stop signal to the other synchronization processing units, and otherwise, the synchronization processing unit transmits a signal-output stop cancellation signal to the other synchronization processing units. The signal output processing unit, when the synchronization processing unit does not receive a signal stop signal, outputs a signal representing the calculation results of the calculating unit to the control unit.

4 Claims, 9 Drawing Sheets

(51) Int. Cl.
    *G21C 17/108*    (2006.01)
    *G21D 3/00*      (2006.01)
    *G21D 3/04*      (2006.01)

(56) References Cited

U.S. PATENT DOCUMENTS

2002/0067790 A1   6/2002   Fukasawa
2009/0315614 A1   12/2009  Kenjyo et al.

FOREIGN PATENT DOCUMENTS

| JP | 07-280984 A   | 10/1995 |
| JP | 10-039082 A   | 2/1998  |
| JP | 2000-275383 A | 10/2000 |
| JP | 2002-116283 A | 4/2002  |
| JP | 2007-003399 A | 1/2007  |
| JP | 2007-278991 A | 10/2007 |
| JP | 2008-275354 A | 11/2008 |
| JP | 2009-192502 A | 8/2009  |

* cited by examiner

FIG. 8

| PATTERN | X-CORRDINATE - Y-CORRDINATE | MONITORING REGION NUMBER | ASSIGNED CALCULATION PROCESSING NUMBER |
|---|---|---|---|
| 1 | 7-7 | 01 | #1 |
| 1 | 7-8 | 01 | #1 |
| 1 | : | : | : |
| 1 | 1-7 | M | #N |
| 2 | 7-7 | 01 | #1 |
| 2 | 7-8 | 01 | #1 |
| 2 | : | : | : |
| 2 | 14-8 | M | #N |
| : | : | : | : |
| X | 7-7 | 01 | #1 |
| X | 8-7 | 02 | #2 |
| X | : | : | : |
| X | 14-7 | M | #N |

CORE THERMAL LIMIT VALUE MONITORING DEVICE, CORE MONITORING SYSTEM AND CORE THERMAL LIMIT VALUE MONITORING METHOD

CROSS REFERENCES TO RELATED APPLICATIONS

This application is a continuation-in-part (CIP) application based upon the International Application PCT/JP2011/000463, the International Filing Date of which is Jan. 28, 2011, the entire content of which is incorporated herein by reference, and claims the benefit of priority from the prior Japanese Patent Application No. 2010-16199, filed in the Japanese Patent Office on Jan. 28, 2010, the entire content of which is incorporated herein by reference.

FIELD

Embodiments of the present invention relates to a core thermal limit value monitoring device, a core monitoring system, and a core thermal limit value monitoring method, which output a signal to a control unit of a nuclear reactor as a result of monitoring a thermal state value of a nuclear reactor core.

BACKGROUND

Generally, in a boiling water nuclear power plant, power control is achieved by control rod operation and recirculation flow control. Thus, a thermal state value is monitored by a core monitoring system. For example, such a core monitoring system performs the monitoring by combining a core performance calculating device that performs time consuming power distribution calculation and a core thermal limit value monitoring device that performs the power distribution calculation in a relatively short time.

The core performance calculating device takes long time to complete the power distribution calculation. Therefore, the core monitoring system that uses the combination of the core performance calculating device and core thermal limit value monitoring device performs monitoring by using, in a complementary manner, the core thermal limit value monitoring device that can obtain a calculation result in a relatively short time.

The calculation time of the core thermal limit value monitoring device is desirably short. However, requirement of calculation processing covering the entire monitoring target region of the core limits a calculation cycle to about 200 ms. The core is divided into a plurality of regions so as to be monitored by a computer having a plurality of CPUs (see, for example, Japanese Patent Application Laid-Open Publication No. 2007-278991, the entire content of which is incorporated herein by reference).

In the case where the core is divided into a plurality of regions so as to be monitored by the computer having a plurality of CPUs, a control unit determines output states of signals from all the CPUs. In this case, however, the control unit needs to determine the signal output state even for a CPU that need not output the signal, so that the control unit cannot perform processing according to the output signals from the core thermal limit value monitoring device, preventing a reduction in the entire calculation time.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 8 is a table illustrating an example of information to be stored in a region definition information storage unit in the second embodiment of the core thermal limit value monitoring device according to the present invention.

DETAILED DESCRIPTION

Figure 1:
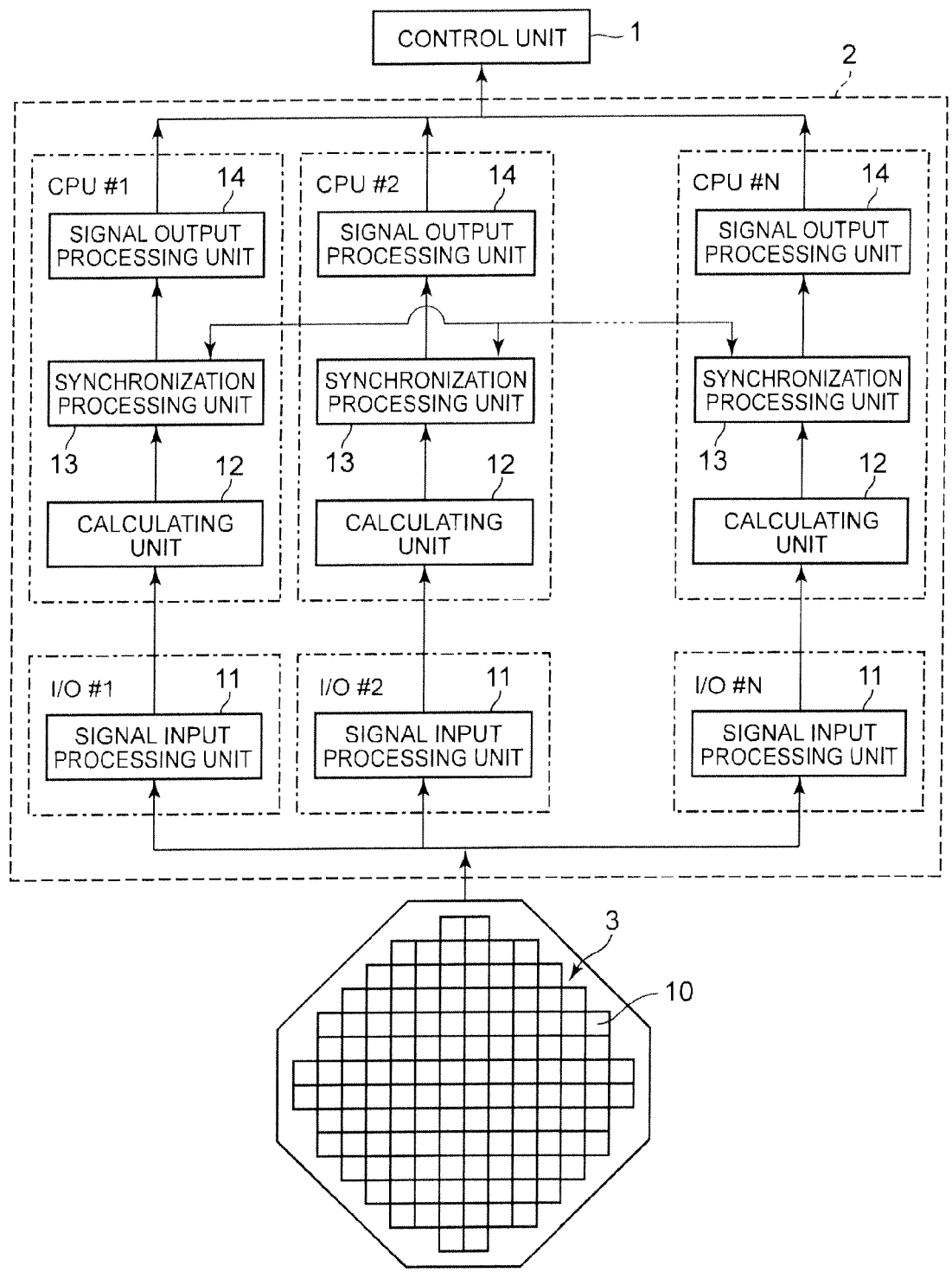
FIG. 1 is a block diagram of a core thermal limit value monitoring device of a first embodiment of the present invention.

An object of embodiments of the present invention is to provide a configuration in which the control unit performs processing according to the output signals from the core thermal limit value monitoring device to shorten the entire calculation cycle.

According to an embodiment, there is provided a core thermal limit value monitoring device that outputs a signal to a control unit of a nuclear reactor as a result of monitoring a thermal state value of a nuclear reactor core, the device comprising: a plurality of signal input processing units each receive a signal representing a state of the core that has been divided into a plurality of regions to be monitored; calculating units provided in correspondence respectively to the signal input processing units, the calculating units each calculating the thermal state values of the regions to be monitored based on the signal received by the corresponding signal input processing unit to determine whether signal output to the control unit is necessary or not; synchronization processing units provided in correspondence respectively to the calculating units; and output processing units provided in correspondence respectively to the calculating units. The synchronization processing unit transmits, if the corresponding calculating unit has determined that it is necessary to perform signal output to the control unit, a signal-output stop signal to the other synchronization processing units, while the synchronization processing unit transmitting, if the corresponding calculating unit has determined that it is not necessary to perform signal output to the control unit, a signal-output stop cancellation signal to the other synchronization processing units. The output processing unit outputs, while the corresponding synchronization processing unit does not receive the signal-output stop signal, a signal representing calculation results of the calculating unit to the control unit.

According to another embodiment, there is provided a core thermal limit value monitoring method that uses a computer including a plurality of CPUs to output a signal to a control unit of a nuclear reactor as a result of monitoring a thermal state value of a nuclear reactor core, the method comprising: a signal inputting step in which the CPUs each receive a signal representing a state of the core that has been divided into a plurality of regions to be monitored; a calculating step in which the CPUs each calculate the thermal state values of the regions to be monitored based on the received signal to determine whether signal output to the control unit is necessary or not; a step of transmitting a signal-output stop signal to the other CPUs if it has been determined that signal output to the control unit is necessary; a step of transmitting a signal-output stop cancellation signal to the other CPUs if it has been determined that signal output to the control unit is unnecessary; and an outputting step of outputting, if it has been determined that signal output to the control unit is necessary, a signal representing calculation results to the control unit while the signal-output stop signal is not received.

According to the present embodiments, the control unit can perform processing according to the output from the core thermal limit value monitoring device, thereby shortening the calculation cycle.

Embodiments of a core thermal limit value monitoring device according to the present invention will be described with reference to the accompanying drawings. Throughout the drawings, the same reference numerals are used to designate the same or similar components, and redundant descriptions thereof are omitted.

First Embodiment

Figure 2:
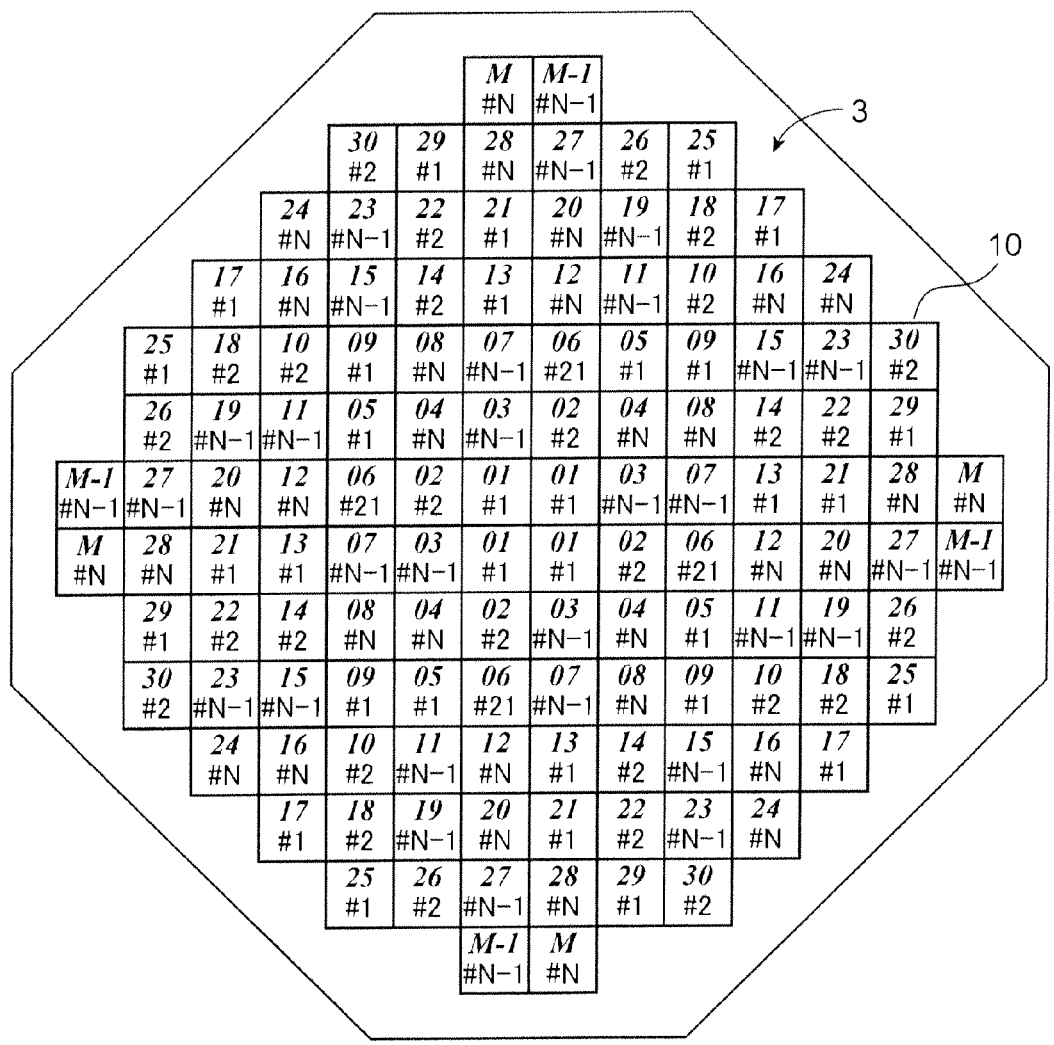
FIG. 2 is an exemplary transverse cross-sectional view illustrating a core region dividing method using the first embodiment of the core thermal limit value monitoring device according to the present invention.

FIG. 1 is a block diagram of a core thermal limit value monitoring device of a first embodiment of the present invention. FIG. 2 is an exemplary transverse cross-sectional view illustrating the core region dividing method using the present embodiment.

A core thermal limit value monitoring device 2 according to the embodiment outputs a signal to a control unit 1 as a result of estimating, e.g., a possibility that a core 3 does not satisfy a thermal limit value based on a signal representing a state of the core 3 that has been received through a local power range monitor (LPRM). The core 3 is divided into M regions. Regions having a same region number may be located apart from each other. As illustrated in FIG. 2, in the present embodiment, the core 3 is divided into 32 regions, which means that M is 32, and each of the 32 regions that is assigned a same region number is located in four mutually apart locations.

The core thermal limit value monitoring device 2 has a plurality of I/Os (input/output units) and corresponding CPUs. In the present embodiment, the number of I/Os and the number of CPUs are assumed to be N. In the core thermal limit value monitoring device 2, the N (#1 to # N) I/Os each has a signal input processing unit 11. The N (#1 to # N) CPUs each has a calculating unit 12, a synchronization processing unit 13, and a signal output processing unit 14.

The calculating units 12 each performs calculation for corresponding region of the core 3. The signal output processing units 14 each outputs a signal to the control unit 1. The synchronization processing units 13 each exchanges a signal-output stop or a signal-output stop cancellation with other CPUs. The signal input processing units 11 each inputs data required for the calculation.

Figure 3:
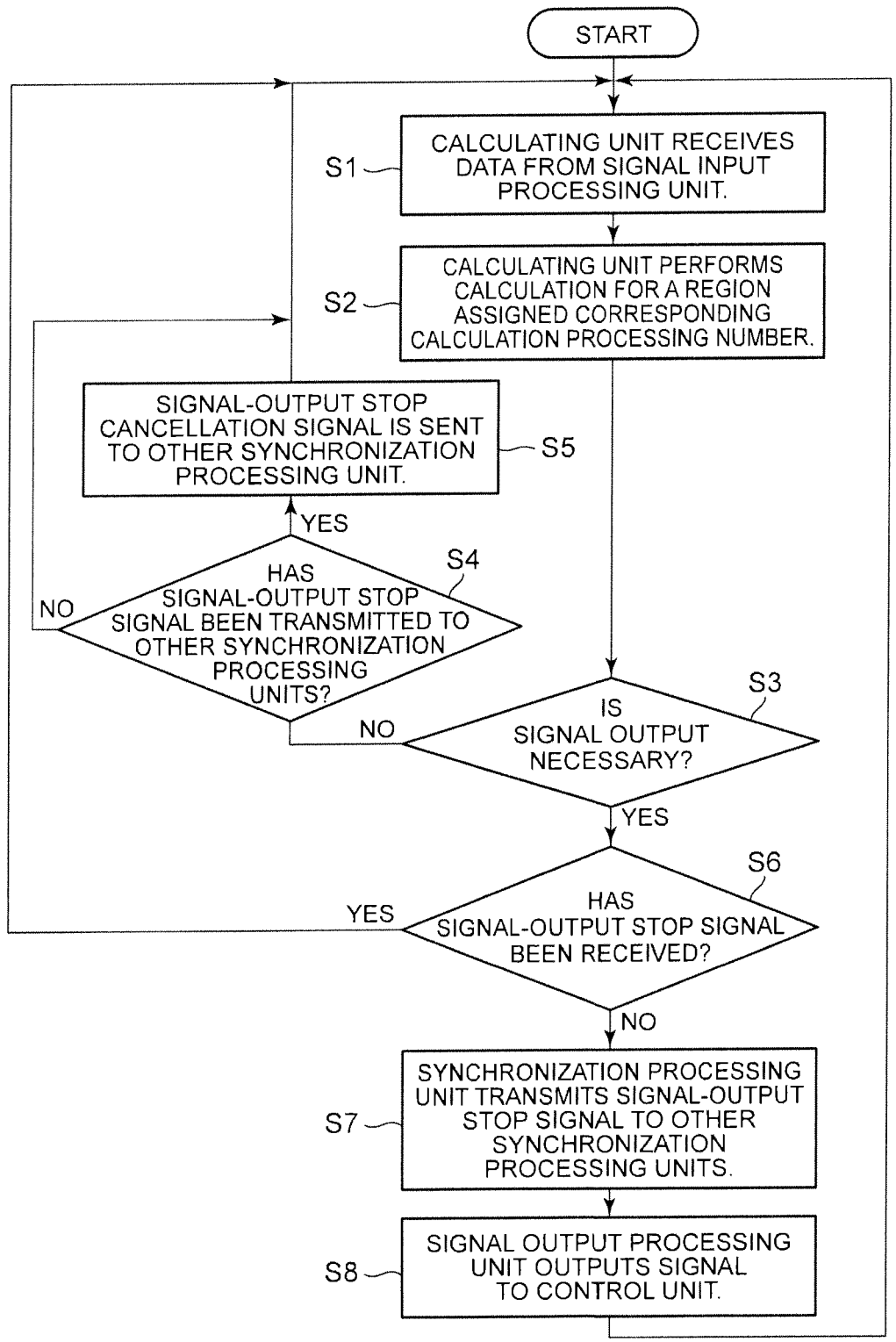
FIG. 3 is a flowchart illustrating a core thermal limit value monitoring method using the first embodiment of the core thermal limit value monitoring device according to the present invention.

FIG. 3 is a flowchart illustrating a core thermal limit value monitoring method using the present embodiment.

The signal input processing units 11 receive signals representing the states of the corresponding regions of the core 3 and transmit the signals to the corresponding calculating units 12 (step S1). The calculating unit 12 of the CPU #1 inputs data from the signal input processing unit 11 of the I/O #1, the calculating unit 12 of the CPU #2 inputs data from the signal input processing unit 11 of the I/O #2, and the calculating unit 12 of the CPU # N input data from the signal input processing unit 11 of the I/O # N.

The calculating units 12 perform required calculation for the regions of the core 3 each having a corresponding assigned calculation processing number to obtain thermal state values (step S2). The calculating unit 12 of the CPU #1 performs calculation for the regions 01, 05, 09, 13, 17, 21, 25, and 29, the calculating unit 12 of the CPU #2 performs calculation for the regions 02, 06, 10, 14, 18, 22, 26, and 30, and the calculating unit 12 of the CPU # N performs calculation for the regions 04, 08, 12, 16, 20, 24, 28, and M. The calculating units 12 each then determines whether a signal output to the control unit 1 is necessary or not (step S3).

The synchronization processing unit 13 of the CPU that has determined that the signal output is necessary instructs, providing it has not received the signal-output stop command from any of the other CPUs, the synchronizing processing of the other CPUs to stop the signal output and performs the signal output through the signal output processing unit 14. The synchronization processing unit 13 of the CPU that has performed the signal output instruction, at a time point when the signal output is unnecessary the synchronization processing units 13 of the other CPUs to cancel the signal output stop command. The CPU that has received the signal output stop command at its corresponding synchronization processing unit 13 does not perform the signal output through the signal output processing unit 14 until the synchronization processing unit 13 receives the signal-output stop cancellation command even if the signal output becomes required as a calculation result from the calculating unit 12.

More specifically, in a case where the signal output to the control unit 1 is unnecessary, the synchronization processing unit 13 corresponding to the calculating unit 12 that has made the determination checks whether or not the signal-output stop signal has been transmitted to the other synchronization processing units 13 (step S4). In the case where the synchronization processing unit 13 has transmitted the signal-output stop signal to the other synchronization processing units 13, it transmits the signal-output stop cancellation signal to the other synchronization processing unit 13 (step S5).

In a case where the signal output to the control unit 1 is necessary, the synchronization processing unit 13 corresponding to the calculating unit 12 that has made the determination checks whether or not it has received the signal-output stop signal from any of the other synchronization processing units 13 (step S6). In the case where the synchronization processing unit 13 has received the signal-output stop signal from any of the other synchronization processing units 13, this flow returns to step S1. In the case where synchronization processing unit 13 has not received the signal-output stop signal from any of the other synchronization processing units 13, it transmits the signal-output stop signal to the other synchronization processing units 13 (step S7) and instructs its corresponding signal output processing unit 14 to perform the signal output processing. According to the above instruction, the signal output processing unit 14 outputs a signal to the control unit 1 (step S8). Thereafter, the flow returns to step S1.

According to the present embodiment, required calculations are shared among the calculating units 12 of the plurality of CPUs, so that a calculation amount per one CPU can be reduced to shorten a calculation time as compared to a case where calculations for all the regions are performed by a single CPU. Further, the plurality of CPUs do not individually output the signals to the control unit 1, but the synchronization processing makes only the CPU that needs to perform the signal outputting outputs the signal. Thus, the control unit 1 can perform processing according to the output signal from the core thermal limit value monitoring device 2 without determining the signal output states from all the CPUs. Therefore, it is possible to shorten the entire calculation time while performing the signal output to the control unit 1 without inconsistency.

Second Embodiment

Figure 4:
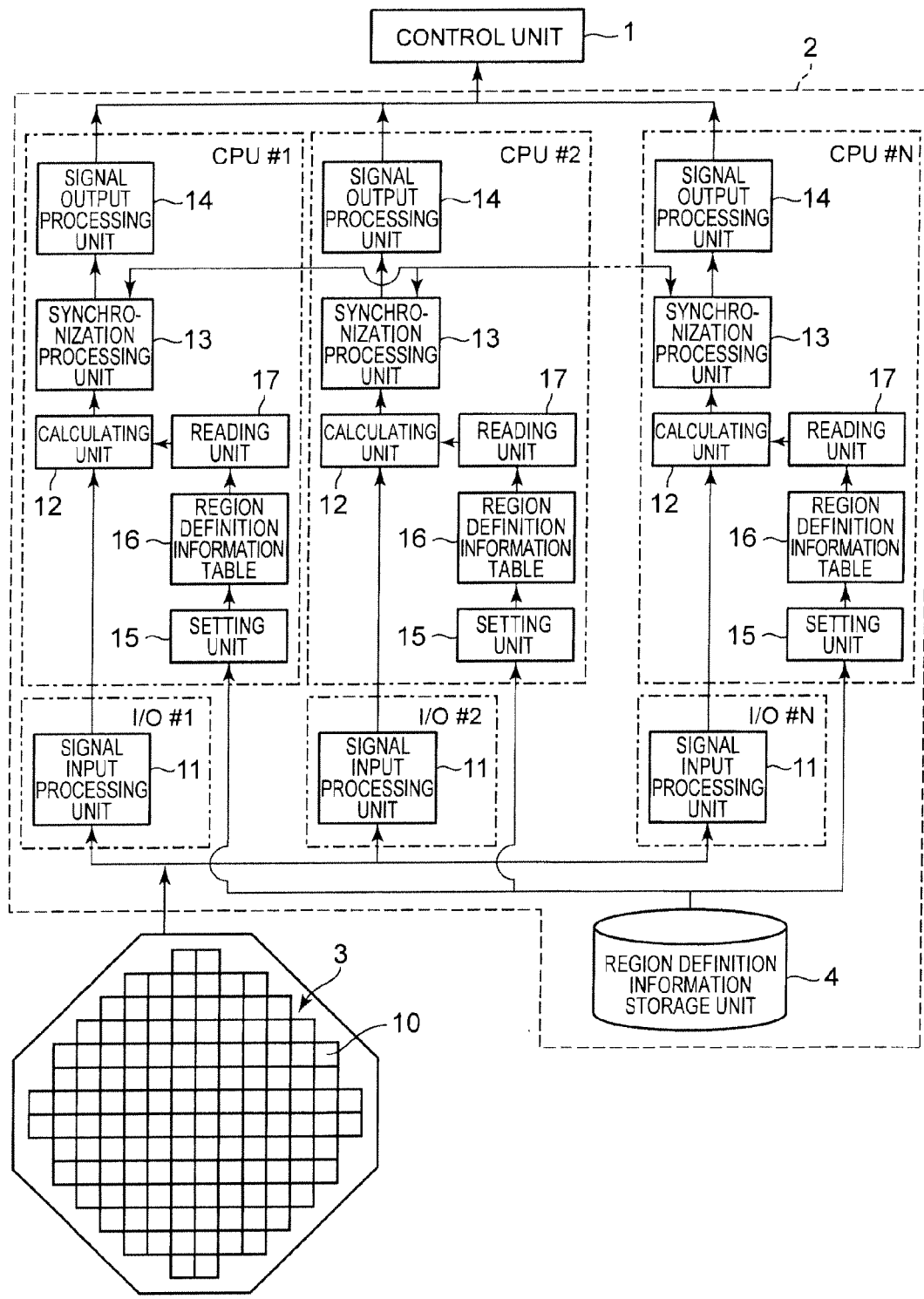
FIG. 4 is a block diagram of the core thermal limit value monitoring device of a second embodiment of the present invention.
Figure 5:
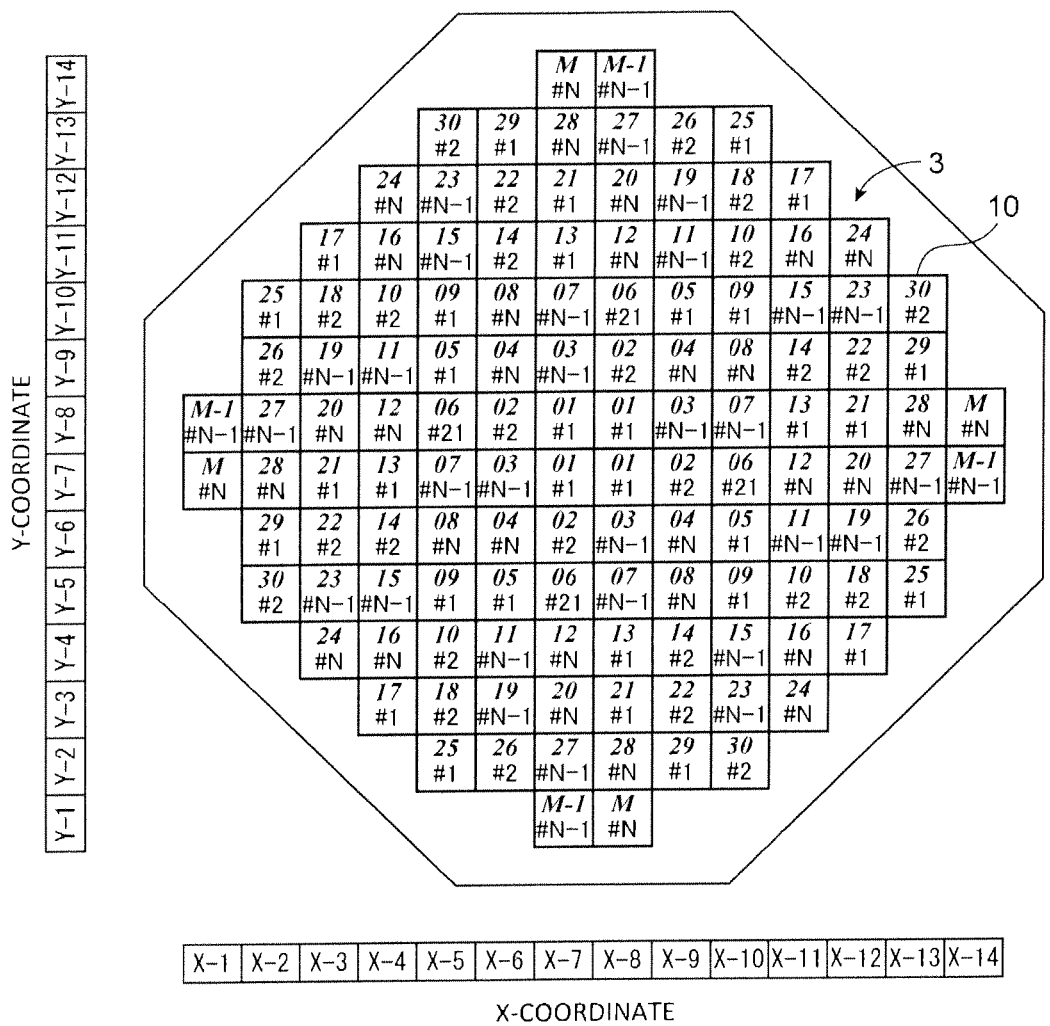
FIG. 5 is an exemplary transverse cross-sectional view illustrating the core region dividing method (pattern 1) in the second embodiment of the core thermal limit value monitoring device according to the present invention.
Figure 6:
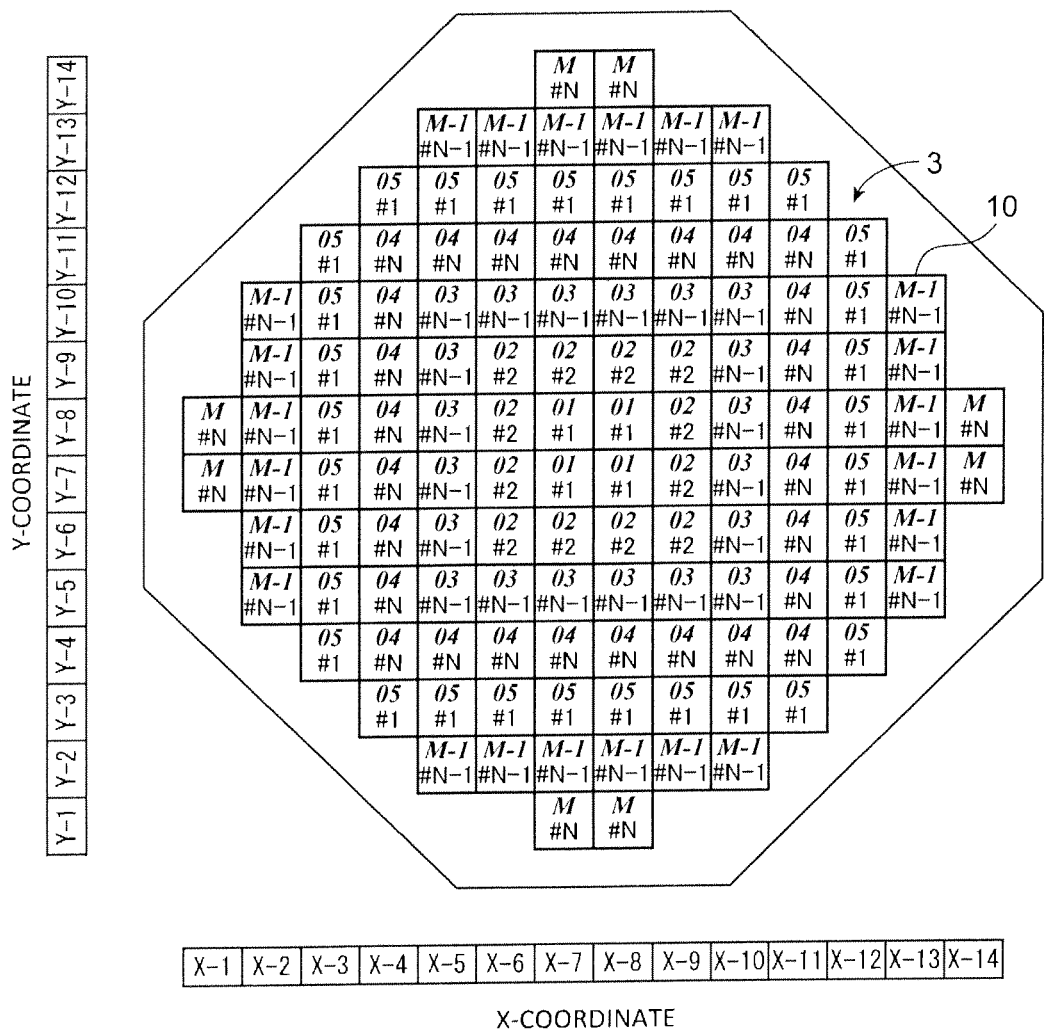
FIG. 6 is an exemplary transverse cross-sectional view illustrating the core region dividing method (pattern 2) in the second embodiment of the core thermal limit value monitoring device according to the present invention.
Figure 7:
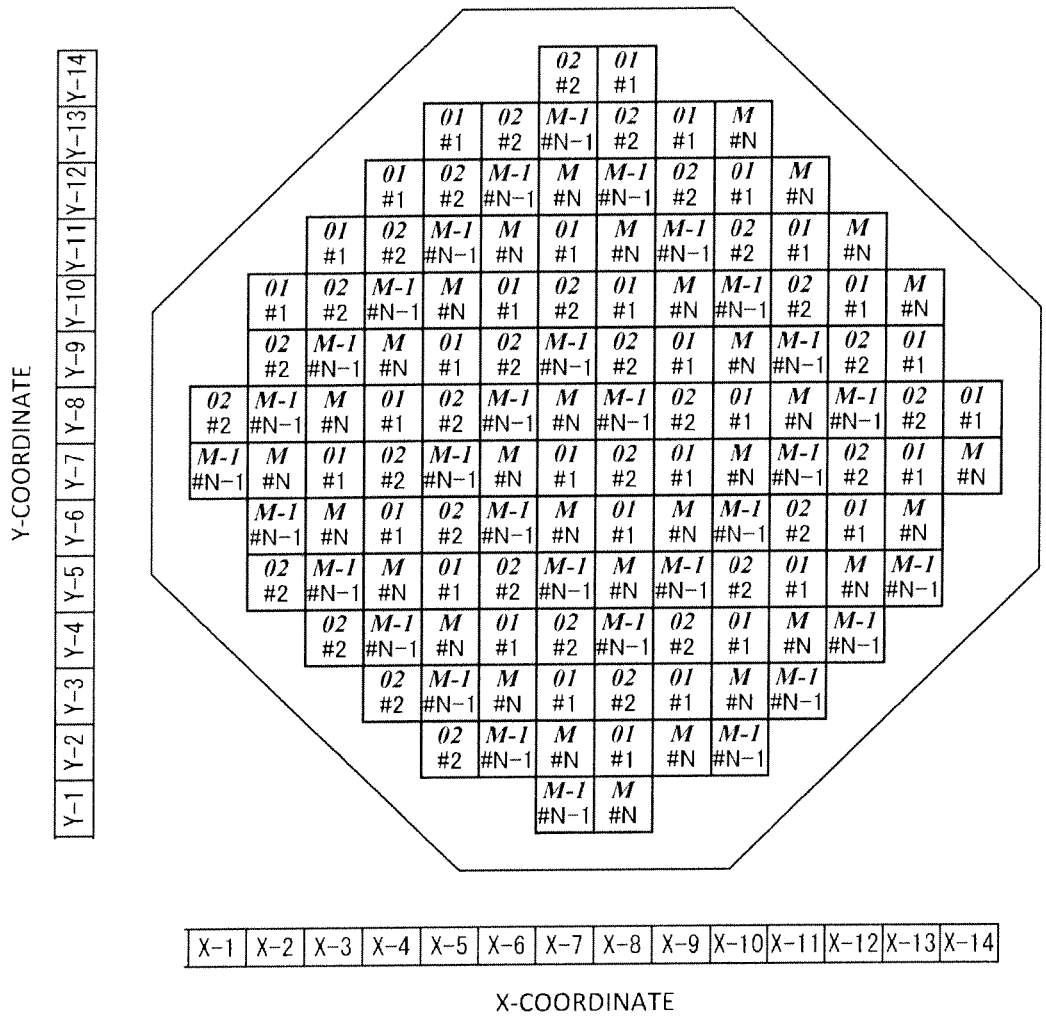
FIG. 7 is an exemplary transverse cross-sectional view illustrating the core region dividing method (pattern X) in the second embodiment of the core thermal limit value monitoring device according to the present invention.

FIG. 4 is a block diagram of the core thermal limit value monitoring device of a second embodiment of the present invention. FIG. 5 is an exemplary transverse cross-sectional view illustrating the core region dividing method (pattern 1) in the present embodiment. FIG. 6 is an exemplary transverse cross-sectional view illustrating the core region dividing method (pattern 2) in the present embodiment. FIG. 7 is an exemplary transverse cross-sectional view illustrating the core region dividing method (pattern X) in the present embodiment. FIG. 8 is a table illustrating an example of information to be stored in a region definition information storage unit in the present embodiment.

In the core thermal limit value monitoring device 2 according to the present embodiment, there are prepared a plurality (1 to X) of patterns of a combination of the M (1 to M) region numbers and the assigned calculation processing number representing which one of the CPUs #1 to # N performs the calculation of each region number which is defined for each region of the core 3. The pattern is set in correspondence to, e.g., a fuel loading pattern for each operation cycle. Each region of the core 3 is represented by a combination of X-coordinate and Y-coordinate. The assigned calculation processing numbers are stored in a region definition information storage unit 4 in a table form as illustrated in FIG. 8, for example.

Each CPU has a setting unit 15, a region definition information table 16, and a reading unit 17. The setting unit 15 sets information stored in the region definition information storage unit 4 in each CPU. The region definition information table 16 retains the set information. The reading unit 17 reflects the information of the region definition information table 16 in the calculating unit 12.

Figure 9:
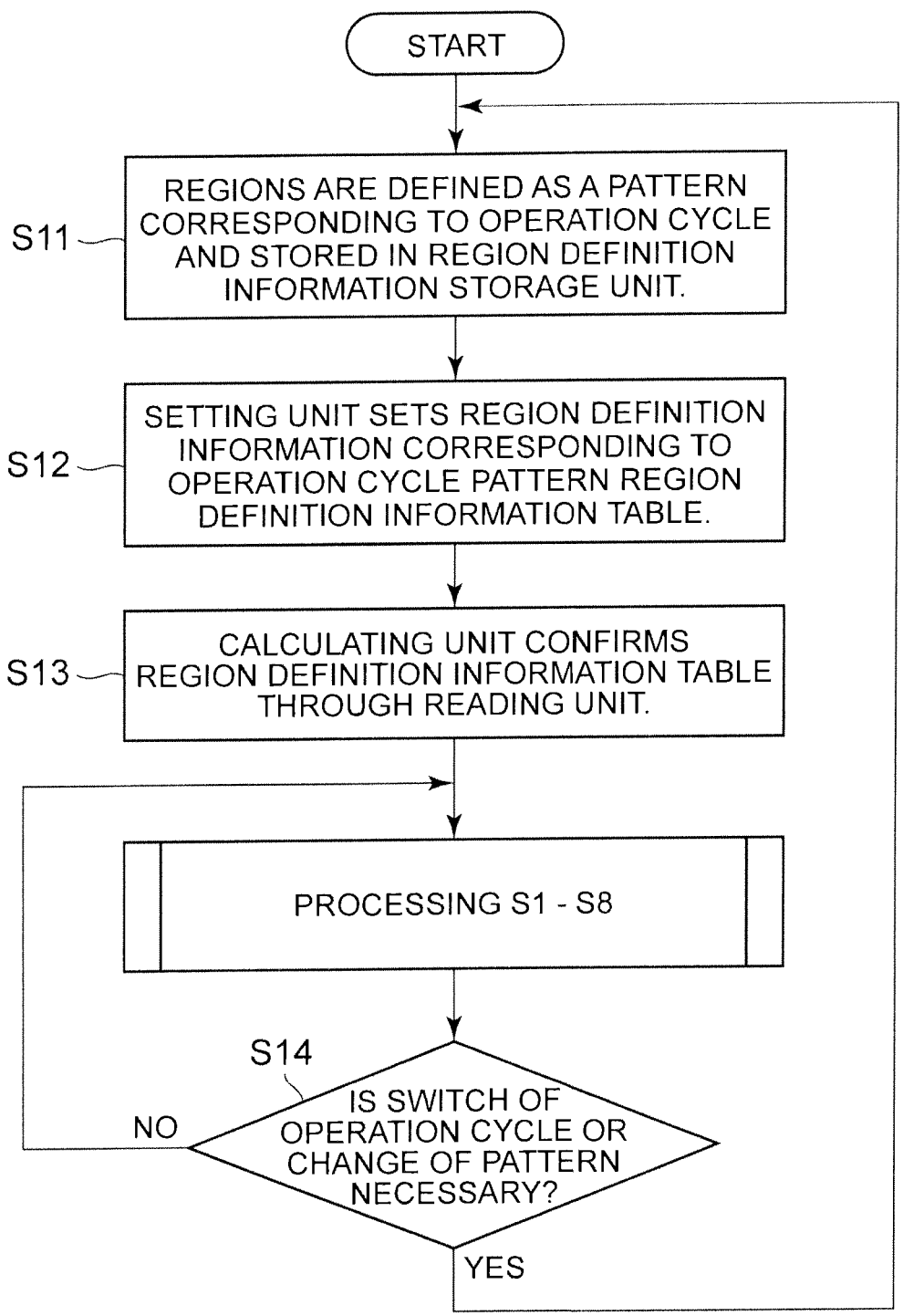
FIG. 9 is a flowchart illustrating the core thermal limit value monitoring method using the second embodiment of the core thermal limit value monitoring device according to the present invention.

FIG. 9 is a flowchart of the core thermal limit value monitoring method using the present embodiment.

The region numbers of 1 to M and assigned calculation processing numbers each representing which one of the CPUs #1 to # N performs the calculation of each region number are defined for each region represented by a combination of X-coordinate and Y-coordinate, and stored in the region definition information storage unit 4 (step S11). Then, the region definition information corresponding to the operation cycle pattern stored in the region definition information storage unit 4 is set in the region definition information table 16 of each CPU through the setting unit 15 (step S12). The calculating unit 12 of each CPU confirms, through the reading unit 17, the pattern set in the region definition information table 16 (step S13).

After that, in a case where a switch of the operation cycle or a change of the pattern is unnecessary (step S14), a series of the processing (step S1 to step S8) in the first embodiment are repeatedly performed. As a result, the calculations for the regions assigned to the calculating unit 12 of each CPU are performed according to the pattern corresponding to the current operation cycle, followed by the synchronizing and signal output processing. In a case where a switch of the operation cycle or a change of the pattern is necessary (step S14), this flow returns to step S11 and the definition of the pattern and setting of the region definition information table are made once again.

According to the present embodiment, required calculations are shared among the calculating units 12 of the plurality of CPUs. Therefore, a calculation amount per one CPU can be reduced to shorten a calculation time as compared to a case where calculations for all the regions are performed by one CPU. Further, the plurality of CPUs do not individually output the signals to the control unit 1, but the synchronization processing makes only a CPU that needs to perform the signal output output the signal. Thus, the control unit 1 can perform processing according to the output signal from the core thermal limit value monitoring device 2 without determining the signal output states from all the CPUs. Therefore, it is possible to shorten the entire calculation time while performing the signal output to the control unit 1 without inconsistency. Further, the region definition information can be changed, so that the definition of the region can be flexibly changed according to the operation cycle.

Other Embodiments

The above embodiments are merely exemplary and do not limit the present invention. Further, the features of the respective embodiments may be combined.

What is claimed is:

1. A core monitoring system comprising:
   a core thermal limit value monitoring device that outputs a signal to a control unit of a nuclear reactor as a result of monitoring a thermal state value of a nuclear reactor core received from a local power range monitor,
   the device comprising: three or more signal input processing units each configured to receive a signal output from the local power range monitor, the signal representing a state of the core that has been divided into three or more regions to be monitored, each of the signal processing units including
   a calculating unit configured to calculate thermal state values of a subset of the regions to be monitored, the thermal state values being calculated based on the signal received by the signal input processing unit to determine whether signal output to the control unit is necessary;
   a synchronization processing unit configured to output a signal-output stop signal and a signal-output stop cancellation signal to synchronization processing units of other signal input processing units; and
   an output processing unit, and
   a control unit of a nuclear reactor, wherein
   if a first calculating unit of a first signal input processing unit has determined that signal output to the control unit is necessary, and a first synchronization processing unit of the first signal input processing unit has not received a signal-output stop signal from a synchronization processing unit of one of the other signal input processing units, the first synchronization processing unit is configured to transmit the signal-output stop signal to synchronization processing units of the other signal input processing units, and a first output processing unit of the first signal input processing unit is configured to output a signal to the control unit representing calculation results of the first calculating unit, if the first calculating unit has determined that signal output to the control unit is necessary, and the first synchronization processing unit has received a signal-output stop signal from a synchronization processing unit of one of the other signal input processing units, the first calculating unit is configured to not transmit the signal-output stop signal or the signal-output stop cancellation signal to the synchronization processing units of the other signal input processing units, if the first calculating unit has determined that signal output to the control unit is not necessary, the first synchronization processing unit is configured to determine whether the signal-output stop signal has been transmitted to the synchronization processing units of the other signal input processing units, and if the synchronization processing units of the other signal input processing units have received the signal-output stop signal, the first synchronization unit is configured to transmit the signal-output stop cancellation signal to the synchronization processing units of the other signal input processing units, and the control unit is configured to control a power level of the nuclear reactor based on the signal output by the core thermal limit value monitoring device to the control unit.

2. The core monitoring system according to claim 1, wherein
the core thermal limit value monitoring device further comprises a region definition information storage unit configured to store a plurality of patterns, each pattern including a combination of region numbers in the regions to be monitored and assigned calculation processing numbers, and each signal input processing unit further comprises:
a setting unit configured to assign one of the patterns stored in the region definition information storage unit to the calculating unit of the signal input processing unit;
a region definition information table configured to store the assigned pattern; and
a reading unit configured to output information from the region definition information table to the calculating unit of the signal input processing unit, the information identifying the subset of regions for which the calculating unit calculates thermal state values.

3. The core monitoring system according to claim 1, further comprising:
a core performance calculating device configured to calculate a distribution of power in the core.

4. A core monitoring method comprising:
a core thermal limit value monitoring method that uses a computer including three or more CPUs to output a signal to a control unit of a nuclear reactor as a result of monitoring a thermal state value of a nuclear reactor core, based on a local power range monitor, the core thermal limit value monitoring method comprising:
a signal inputting step in which the CPUs each receive a signal output from the local power range monitor, the signal representing a state of the core that has been divided into three or more regions to be monitored;
a calculating step in which the CPUs each calculate thermal state values of the regions to be monitored based on the received signal to determine whether signal output to the control unit is necessary;
if a CPU has determined that signal output to the control unit is necessary, and the CPU has not received a signal-output stop signal from one of the other CPUs, the CPU performs a signal transmitting step of transmitting a signal output stop signal to the other CPUs and an outputting step of outputting a signal representing calculation results from the calculation step to the control unit;
if the CPU has determined that signal output to the control unit is necessary, and the CPU has received a signal-output stop signal from one of the other CPUs, the CPU does not perform the signal transmitting step;
if the CPU has determined that signal output to the control unit is not necessary, the CPU performs a determination step of determining whether the signal-output stop signal has been transmitted to the other CPUs, and if the other CPUs have received the signal-output stop signal, the CPU performs a signal cancellation step of transmitting a signal-output stop cancellation signal to the other CPUs; and
controlling a power level of the nuclear reactor based on the signal output to the control unit by the computer including three or more CPUs.

* * * * *